US011381951B2

United States Patent
Hsieh

(10) Patent No.: US 11,381,951 B2
(45) Date of Patent: Jul. 5, 2022

(54) WIRELESS BLUETOOTH (BT) AUDIO OUTPUT SYSTEM AND CONTROL METHOD THEREOF

(71) Applicant: Airoha Technology Corp., Hsinchu (TW)

(72) Inventor: Ming-Yi Hsieh, Hsinchu (TW)

(73) Assignee: AIROHA TECHNOLOGY CORP., Hsinchu (TW)

( * ) Notice: Subject to any disclaimer, the term of this patent is extended or adjusted under 35 U.S.C. 154(b) by 0 days.

(21) Appl. No.: 17/002,947

(22) Filed: Aug. 26, 2020

(65) Prior Publication Data

US 2021/0144532 A1 May 13, 2021

Related U.S. Application Data

(60) Provisional application No. 62/934,527, filed on Nov. 13, 2019.

(30) Foreign Application Priority Data

Feb. 11, 2020 (TW) .................................. 109104269

(51) Int. Cl.
*H04W 4/80* (2018.01)
*H04W 76/15* (2018.01)
*H04W 76/20* (2018.01)

(52) U.S. Cl.
CPC ............. *H04W 4/80* (2018.02); *H04W 76/20* (2018.02)

(58) Field of Classification Search
CPC ....... H04W 4/80; H04W 76/20; H04W 84/18; H04W 76/14; H04W 76/15
See application file for complete search history.

(56) References Cited

U.S. PATENT DOCUMENTS

| | | | | |
|---|---|---|---|---|
| 7,263,331 B2* | 8/2007 | Gupta | ................... | H04W 88/02 713/168 |
| 8,634,845 B2* | 1/2014 | Frost | ..................... | H04W 60/02 455/436 |
| 2006/0262739 A1* | 11/2006 | Ramirez | ............... | H04W 88/06 370/311 |
| 2007/0259621 A1* | 11/2007 | Lin | ..................... | H04M 1/6066 455/41.2 |
| 2009/0239471 A1* | 9/2009 | Tran | ...................... | H04W 88/06 455/41.2 |
| 2016/0119942 A1* | 4/2016 | Wang | ................... | H04B 7/0691 370/336 |
| 2017/0006415 A1 | 1/2017 | Song | | |
| 2018/0234494 A1* | 8/2018 | Klemets | .................. | H04L 12/12 |

(Continued)

OTHER PUBLICATIONS

TW Office Action dated Dec. 25, 2020 in Taiwan application (No. 109104269).

*Primary Examiner* — Andrew Wendell
(74) *Attorney, Agent, or Firm* — McClure, Qualey & Rodack, LLP

(57) ABSTRACT

A control method for a wireless Bluetooth (BT) audio output system includes: establishing an active link between a main BT controller to a first BT smart device among a plurality of BT smart devices; establishing an inactive link between an extra BT controller to a second BT smart device among the plurality of BT smart devices; and playing, by means of an audio output element, media data transmitted from the first BT smart device via the active link under control of the primary BT controller.

18 Claims, 5 Drawing Sheets

(56) References Cited

U.S. PATENT DOCUMENTS

| | | | |
|---|---|---|---|
| 2019/0370376 A1* | 12/2019 | Demmon | G06F 16/27 |
| 2020/0169803 A1* | 5/2020 | Kao | H04R 1/1041 |
| 2020/0195030 A1* | 6/2020 | Long | H02J 7/00034 |
| 2020/0221359 A1* | 7/2020 | Srivastava | H04W 4/80 |
| 2021/0045191 A1* | 2/2021 | Hsieh | H04W 84/20 |
| 2021/0144500 A1* | 5/2021 | Yan | H04R 1/406 |
| 2021/0160607 A1* | 5/2021 | Liu | H04B 1/3888 |

* cited by examiner

WIRELESS BLUETOOTH (BT) AUDIO OUTPUT SYSTEM AND CONTROL METHOD THEREOF

This application claims the benefit of U.S. provisional application Ser. No. 62/934,527, filed Nov. 13, 2019, and Taiwan application Serial No. 109104269, filed Feb. 11, 2020, the subject matter of which are incorporated herein by reference.

BACKGROUND OF THE INVENTION

Field of the Invention

The invention relates in general to a wireless Bluetooth (BT) audio output system and a control method thereof.

Description of the Related Art

In terms of the Bluetooth (BT) technology, multipoint mode is the current trend. Through multipoint mode, a BT earbud can be used in conjunction with two or more BT mobile phones. For example, if a BT earbud is linked to two BT mobile phones at the same time, the user will be able to communicate with the two BT mobile phones without disconnecting the link from one BT mobile phone and then connecting the link to the other BT mobile phone.

Currently, a time division mechanism of the BT technology allows two or more BT mobile phones to share the resource of the BT earbud. However, since only one BT mobile phone is allowed to use a radio frequency source of the BT earbud, extra transmission delay will occur when the link with the BT earbud is switched from one BT mobile phone to another BT mobile phone.

SUMMARY OF THE INVENTION

According to one embodiment of the present disclosure, a wireless Bluetooth (BT) audio output system is provided. The wireless BT audio output system is linked to a plurality of BT smart devices. A plurality of BT links are established between the BT smart devices and the wireless BT audio output system; and the plurality of BT links includes an active link and at least one inactive link. The wireless BT audio output system includes: a primary BT controller, coupled to the active link, configured to serve the active link; a secondary BT controller, coupled to the primary BT controller, configured to be linked to the at least one inactive link and serve the at least one inactive link; and an audio output element coupled to the primary BT controller, wherein the primary BT controller plays media data via the active link by means of the audio output element.

According to another embodiment of the present disclosure, a control method for a wireless Bluetooth (BT) audio output system is provided. The control method includes: establishing an active link to a first BT smart device among a plurality of BT smart devices by a primary BT controller; establishing at least one inactive link to a second BT smart device among the plurality of BT smart devices by a secondary BT controller: and playing, by means of an audio output element, media data transmitted from the first BT smart device via the active link under control of the primary BT controller.

According to another embodiment of the present disclosure, an earbud is provided. The earbud is linked to a first BT device via a first link and a second BT device via a second link. The earbud includes a speaker and a first BT controller.

The first BT controller is configured to serve an active link at any period of time, wherein the active link is a medium for carrying data to be played by the speaker, wherein the active link is the first link.

The above and other aspects of the invention will become better understood with regard to the following detailed description of the preferred but non-limiting embodiment(s). The following description is made with reference to the accompanying drawings.

DETAILED DESCRIPTION OF THE INVENTION

Technical terms are used in the specification with reference to generally-known terminologies used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

Figure 1:
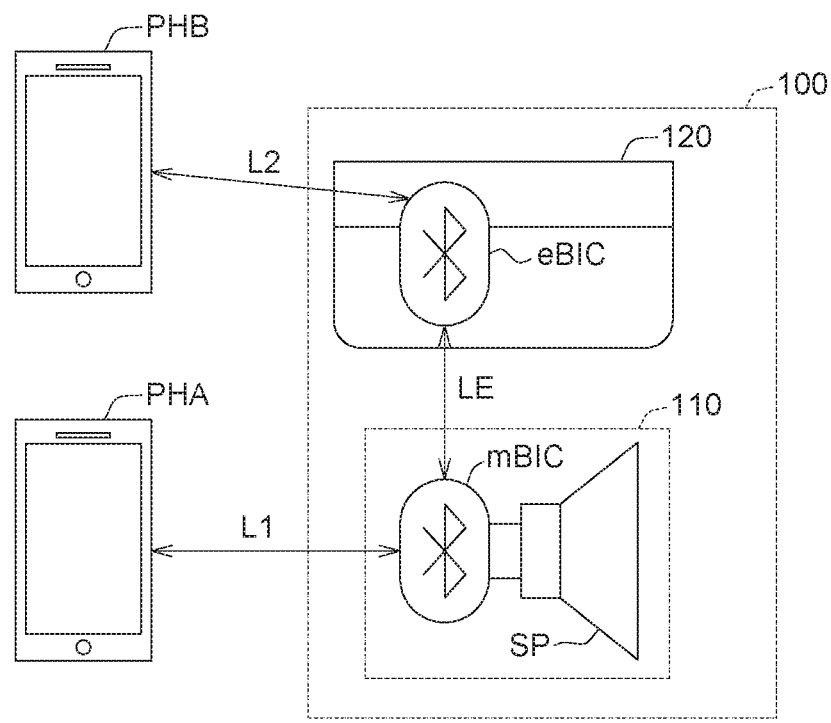
FIG. 1 is a functional block diagram of a wireless BT audio output system according to an embodiment of the present disclosure.

FIG. 1 is a functional block diagram of a wireless Bluetooth (BT) audio output system 100 according to an embodiment of the present disclosure. Referring to FIG. 1, the wireless BT audio output system 100 includes a wireless BT audio output device 110 and a charging case 120. The wireless BT audio output device 110 includes a primary BT controller mBIC and a speaker SP (also referred to as an audio output element). The charging case 120 includes a secondary BT controller eBIC. In further detail, the secondary BT controller eBIC is integrated in a chip independent of another chip in which the primary BT controller mBIC is integrated. The primary BT controller mBIC is coupled to the speaker SP. The primary BT controller mBIC is wiredly or wirelessly coupled to the secondary BT controller eBIC. The wireless BT audio output device 110 includes but not limited to a wireless BT audio output device such as a wireless BT earbud or a wireless BT sound box.

Figure 2:
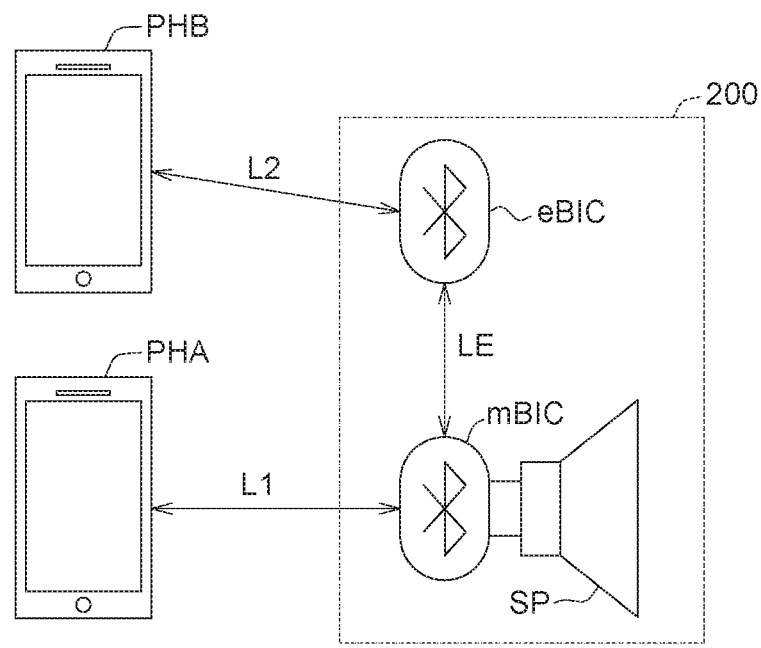
FIG. 2 is a functional block diagram of a wireless BT audio output system according to another embodiment of the present disclosure.

FIG. 2 is a functional block diagram of a wireless BT audio output system 200 according to another embodiment of the present disclosure. The wireless BT audio output system 200 includes a primary BT controller mBIC, a speaker SP and a secondary BT controller eBIC. The primary BT controller mBIC is coupled to the speaker SP. The primary BT controller mBIC is wiredly or wirelessly coupled to the secondary BT controller eBIC. The wireless BT audio output system 200 includes but not limited to a wireless BT audio output device such as a wireless BT earbud or a wireless BT sound box.

As indicated in FIG. 1, the primary BT controller mBIC and the secondary BT controller eBIC are disposed in two independent devices (the wireless BT audio output device 110 and the charging case 120), respectively. In contrast to the embodiment in FIG. 1, in FIG. 2, the primary BT controller mBIC and the secondary BT controller eBIC are disposed (or, integrated) in the same independent device.

Referring back to FIG. 1, the wireless BT audio output system 100 is coupled to two BT mobile phones PHA and PHB through Bluetooth connection, wherein the BT mobile phone is also referred to as a BT smart device. A BT link between the wireless BT audio output system 100 and the BT mobile phone PHA is referred to as a link L1, and another BT link between the wireless BT audio output system 100 and the BT mobile phone PHB is referred to as a link L2. One of the BT links L1 and L2 is an active link, and the other of the BT links L1 and L2 is an inactive link. In the present disclosure, the active link is a link that allows a mobile phone to play audio through the wireless BT audio output device 110. In addition, the inactive link is a link that allows another mobile phone to maintain links to the wireless BT audio output device 110 (but the another mobile phone does not have control of playing audio). In further detail, which link among all created links functions as an active link is determined by an earbud. In addition, the earbud is configured such that the speaker SP is allowed to play media data transmitted via only an active link, and is prohibited to play media data transmitted via an active link. The active link is a medium for carrying data to be played by the speaker. The inactive link is a medium for carrying data free of being played by the speaker. In some embodiments, an active link is a link which serves a real-time streaming. In contrast to the active link, the inactive link is a link which does not serve the real-time streaming. In addition to the BT links L1 and L2, a link LE is a link between the primary BT controller mBIC and the secondary BT controller eBIC.

In an embodiment of the present disclosure, the primary BT controller mBIC not only serves an active link, but also serves a link between the primary BT controller mBIC and the secondary BT controller eBIC. The secondary BT controller eBIC serves the inactive link, and thus the inactive link between another mobile phone (which does not have control of playing audio, for example, the BT mobile phone PHB) and the wireless BT audio output system 100 is kept.

Generally, because of the limited radio frequency source allocated to a controller, for one controller, a quantity of links able to be served by its radio frequency source, is limited to one at any period of time, which may cause time delay. The radio frequency source includes a radio frequency hardware, such as a transceiver and a receiver. For the better understanding of reasons for time delay, it is assumed that there are two BT devices and one controller, and assumed that the two BT devices have been paired with the controller. As a result of the pairing, for example, a first piconet is defined by the paired controller and a first BT device of the two BT devices, and a second piconet is defined by the paired controller and a second BT device of the two BT devices.

In the first piconet, the controller and the first BT device communicates with each other via a first link. In the second piconet, the controller and the second BT device communicates with each other via a second link. As previously mentioned, because of the limited radio frequency source, the controller is unable to serve two links, the first link and the second link, at the same time.

In operation, initially, the controller communicates with the first BT device via the first link. After completion of such communication, the controller switches from the first piconet associated with the first link to the second piconet associated with the second link. That is, the controller changes from serving the first link to serving the second link.

When the controller communicates with the second BT device via the second link, the first BT device remains transmitting packets but fails to, due to the first link not being served by the controller, receive any acknowledgement from the controller. As such, the first BT device is likely to entering a sleep mode.

Once the communication via the second link is completed, the controller switches from the second piconet back to the first piconet. That is, the controller changes from serving the second link back to serving the first link. It is assumed that the first BT device entered and remained in the sleep mode after the controller switched to the second piconet. Since the first BT device is in the sleep mode, an additional time is required for the first BT device to wake up from the sleep mode. Such additional time is referred to as the aforesaid time delay.

In the present disclosure, two types of links are defined, and the two types of links include an active link and an inactive link. Further, function of an inactive link is separated off from function of a link, and is served by the secondary BT controller eBIC. With the secondary BT controller eBIC, task for serving an inactive link L2 is took over by the secondary BT controller eBIC. There is no need for the primary BT controller mBIC to communicate with the BT mobile phone PHB. The primary BT controller mBIC focuses on serving the active link L1. As such, if the BT mobile phone PHB requests communication, the communication proceeds via the inactive link L2 being served by the secondary BT controller eBIC. Unlike the previously mentioned circumstance, the active link L1 is kept being served by the primary BT controller mBIC during the communication requested by the BT mobile phone PHB proceeds. Accordingly, via the active link L1 being served, the primary BT controller mBIC is able to reply a request for communication from the BT mobile phone PHA by, for example, sending acknowledgment to the BT mobile phone PHA via the served active link L1. With the acknowledgment, the BT mobile phone PHA stays awake. Unlike the first BT device, there is no need to wake up the BT mobile phone PHA, and the additional time for such wake-up operation is conserved. As a result, the BT output system 100 is time efficient.

For the convenience of explanation, an operation of the wireless BT audio output system 100 in FIG. 1 is exemplified below. However, persons skilled in the art can infer an operation of the wireless BT audio output system 200 of FIG. 2 based on the operation of the wireless BT audio output system 100 in FIG. 1.

Figure 3:
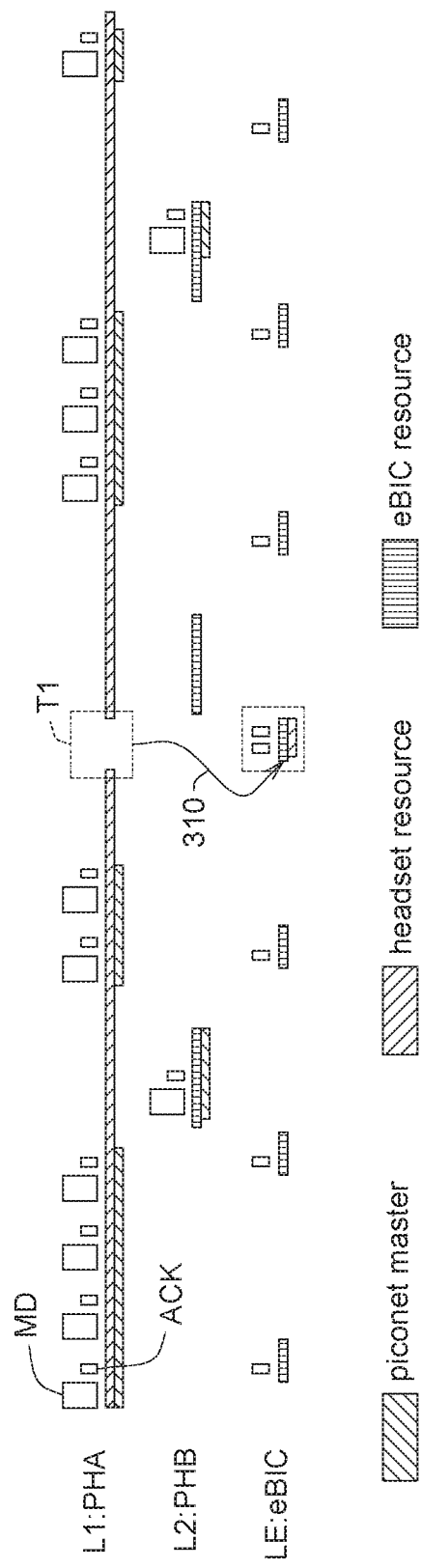
FIG. 3 is a schematic diagram of media streaming of a wireless BT audio output system according to an embodiment of the present disclosure.

FIG. 3 is a schematic diagram of media streaming of a wireless BT audio output system according to an embodiment of the present disclosure. Referring to FIG. 3, it is assumed that the BT link L1 is an active link. That is, a media data MD from the BT mobile phone PHA can be played through the speaker SP of the wireless BT audio output system 100. It is assumed that the BT link L2 is an inactive link. That is, a media data MD of the BT mobile phone PHB cannot be played through the speaker SP of the wireless BT audio output system 100. A label "ACK" in FIG. 3 represents an acknowledge signal.

As indicated in FIG. 3, since the BT link L1 is an active link, the media data MD of the BT mobile phone PHA can always be played through the speaker SP of the wireless BT audio output system 100. That is, the BT link L1, currently being an active link, can always share an earbud resource such as the speaker SP. In terms of piconet masters, both the BT mobile phone PHA and the BT mobile phone PHB can be used as a piconet master.

In an embodiment of the present disclosure, a suitable time slot for synchronization between the primary and secondary BT controllers mBIC can be selected by the primary BT controller mBIC. For example, a time slot T1 in which no data is transmitted through an active link (step 310) is selected by the primary BT controller mBIC for synchronization with the secondary BT controller eBIC. As a result, data transmission through the active link will not be affected. The time slot T1 is also referred to as a free time slot, in which no data is transmitted to the primary BT controller mBIC through the active link.

Basically, no earbud resource will be allocated to the BT link L2, which is currently an inactive link. However, the BT link L2 between the secondary BT controller eBIC and another mobile phone (which does not have control of playing audio, for example the BT mobile phone PHB) is kept. That is, the secondary BT controller eBIC can share resource with the inactive link, but the secondary BT controller eBIC cannot share resource with the active link.

Figure 4:
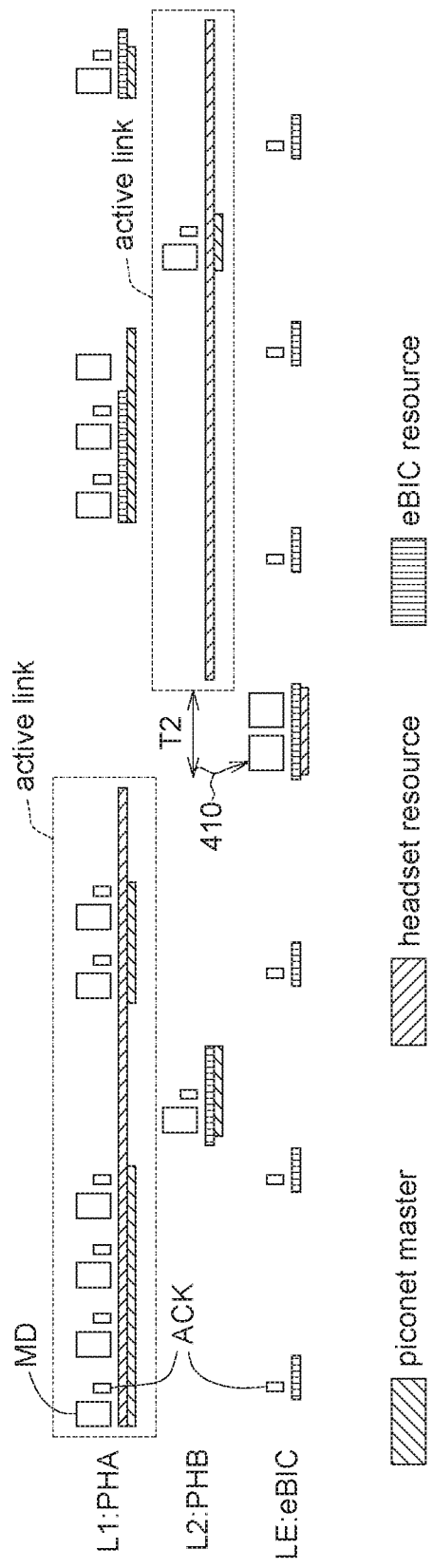
FIG. 4 is a schematic diagram illustrating switching of an active link of a wireless BT audio output system according to an embodiment of the present disclosure.

FIG. 4 is a schematic diagram illustrating switching of an active link of a wireless BT audio output system according to an embodiment of the present disclosure. In an embodiment of the present disclosure, if necessary, the primary BT controller mBIC can switch an active link. Refer to FIG. 4. It is assumed that the BT link L1 is an active link. For example, when the BT mobile phone PHB being linked via an inactive link receives a call or a request for playing music at a time slot T2, the primary BT controller mBIC switches the active link. After the switching, the BT link L2 is changed from the inactive link to the active link, and the BT link L1 is changed from the active link to the inactive link. Also, when the primary BT controller mBIC switches the active link, the primary BT controller mBIC can synchronize with the secondary BT controller eBIC (step 410). In further detail, the primary BT controller mBIC synchronizes at least one parameter of at least one of an active link and an inactive link with the secondary BT controller eBIC.

As disclosed in above embodiments, the primary BT controller mBIC can support real-time streaming, and the secondary BT controller eBIC can support an inactive link. Additionally, the secondary BT controller eBIC can support more inactive links without affecting the real-time streaming of the active link.

Figure 5:
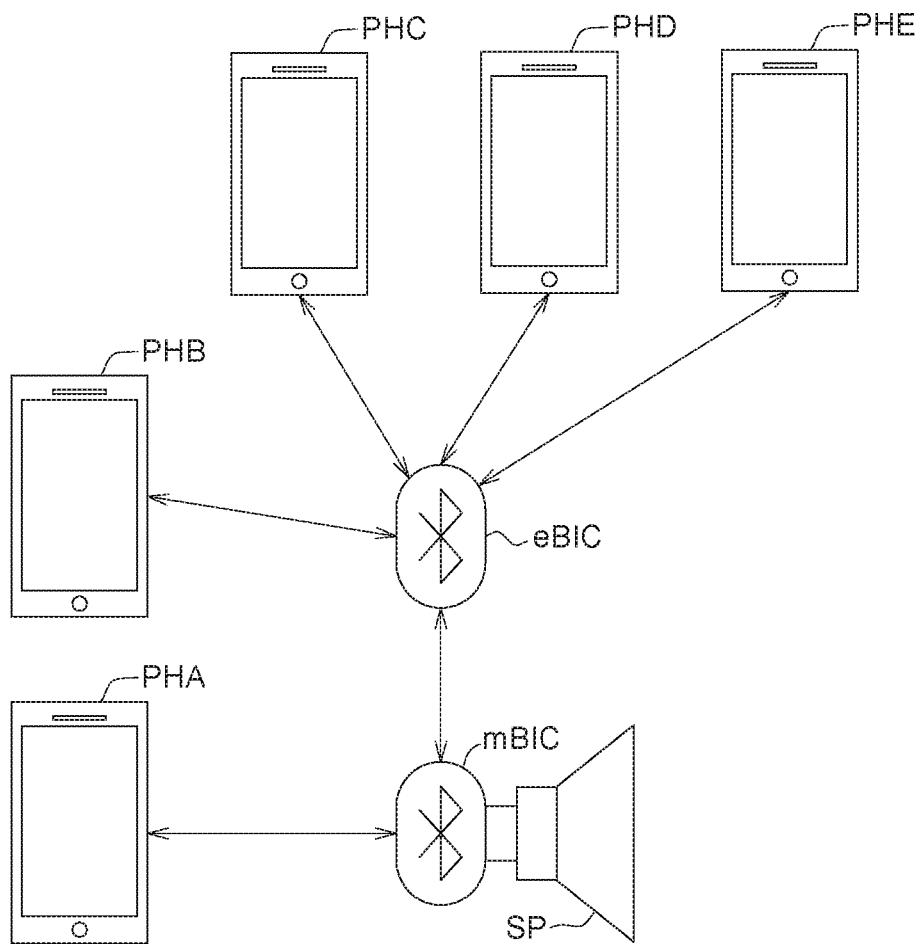
FIG. 5 is a schematic diagram of a wireless BT audio output system according to another embodiment of the present disclosure.

FIG. 5 is a schematic diagram of a wireless BT audio output system according to another embodiment of the present disclosure. Referring to FIG. 5, given that the architecture of FIG. 1 or FIG. 2 is used, under the premise that a real-time streaming of an active link is not affected, the secondary BT controller eBIC can support up to four inactive links, wherein mobile phones PHC to PHE are also BT mobile phones. Such arrangement is still within the spirit of the present disclosure.

Regardless the secondary BT controller eBIC supports or serves one or more inactive links, the primary BT controller mBIC still serves one and the only one active link. Moreover, the primary BT controller mBIC is also linked to the secondary BT controller eBIC.

Figure 6:
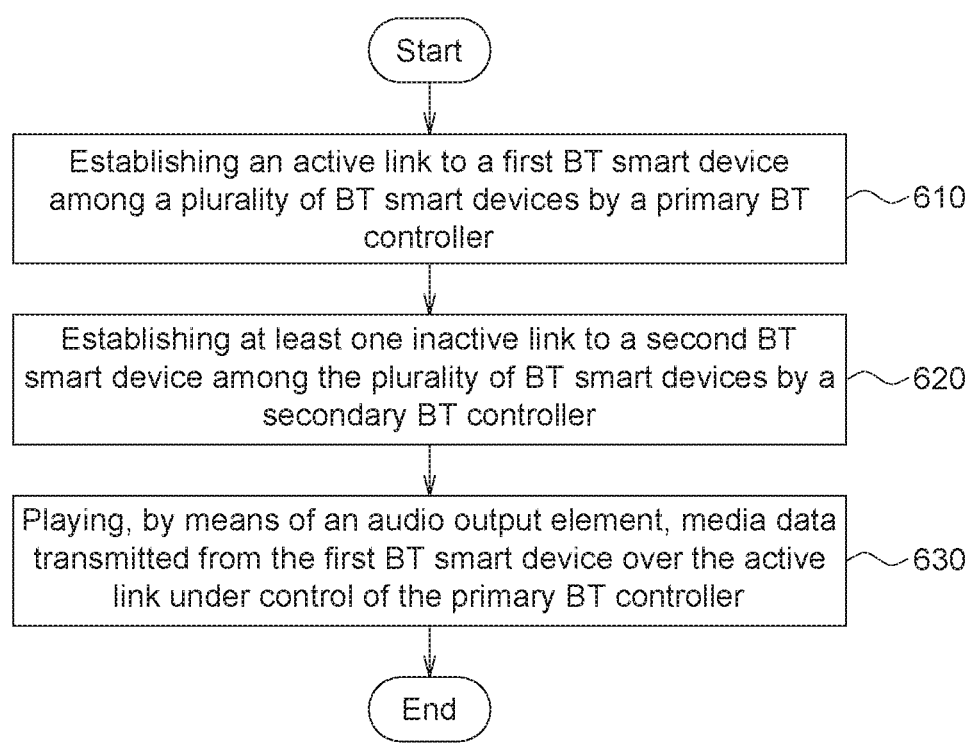
FIG. 6 is a flowchart of a control method for a wireless BT audio output system according to another embodiment of the present disclosure.

FIG. 6 is a flowchart of a control method for a wireless BT audio output system according to another embodiment of the present disclosure. The control method for a wireless BT audio output system includes: establishing an active link to a first BT smart device among a plurality of BT smart devices by a primary BT controller (step 610); establishing at least one inactive link to a second BT smart device among the plurality of BT smart devices by a secondary BT controller (step 620); and playing, by means of an audio output element, media data transmitted from the first BT smart device via the active link under control of the primary BT controller (step 630).

In an embodiment of the present disclosure, the secondary BT controller eBIC supports or serves one or more inactive links, but the primary BT controller mBIC serves one and the only one active link. Therefore, under the premise that a real-time streaming of an active link is not affected, the wireless BT audio output system of the present disclosure not only serves more BT mobile phones, and but also can maintain links with the BT mobile phones. Moreover, extra delay which occurs due to the switching of shared resources in the prior art can also be reduced.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wireless Bluetooth (BT) audio output system, linked to a plurality of BT smart devices, a plurality of BT links established between the BT smart devices and the wireless BT audio output system, the plurality of BT links including an active link and at least one inactive link, the wireless BT audio output system comprising:
   a primary BT controller, coupled to the active link, configured to serve the active link;
   a secondary BT controller, coupled to the primary BT controller, configured to be linked to the at least one inactive link and serve the at least one inactive link; and
   an audio output element coupled to the primary BT controller,
   wherein the primary BT controller plays media data via the active link by means of the audio output element;
   wherein one of the BT smart devices is linked to only one of the primary BT controller and the secondary BT controller through only one of the active link and the inactive link, and another of the BT smart devices is linked to another one of the primary BT controller and the secondary BT controller through only another one of the active link and the inactive link.

2. The wireless BT audio output system according to claim 1, wherein the primary BT controller synchronizes with the secondary BT controller in a free time slot.

3. The wireless BT audio output system according to claim 1, wherein the primary BT controller is configured to control switching of the active link.

4. The wireless BT audio output system according to claim 3, wherein a first link via which a first BT smart device among the BT smart devices is linked is the active link, and a second link via which a second BT smart device among the BT smart devices is linked is the at least one inactive link,
   wherein when the second BT smart device receives a call or a request for playing music, the primary BT controller switches the active link to switch the first link of the first BT smart device to the at least one inactive link and to switch the second link of the second BT smart device to the active link.

5. The wireless BT audio output system according to claim 3, wherein when the primary BT controller switches the active link, the primary BT controller synchronizes with the secondary BT controller.

6. The wireless BT audio output system according to claim 1, wherein the primary BT controller and the secondary BT controller both are disposed in the same BT earbud.

7. The wireless BT audio output system according to claim 1, wherein the primary BT controller is disposed in a BT earbud, and the secondary BT controller is disposed in a charging case.

8. A control method of a wireless BT audio output system, the control method comprising:
    establishing only one active link to only one first BT smart device among a plurality of BT smart devices by only one primary BT controller;
    establishing only one inactive link to only one second BT smart device among the plurality of BT smart devices by only one secondary BT controller; and
    playing, by means of an audio output element, media data transmitted from the first BT smart device via the active link under control of the primary BT controller.

9. The control method according to claim 8, further comprising:
    synchronizing the primary BT controller with the secondary BT controller in a free time slot.

10. The control method according to claim 8, wherein the primary BT controller is configured to control switching of the active link.

11. The control method according to claim 10, wherein the first BT smart device is linked via a first link, and the second BT smart device is linked via second link,
    wherein when the second BT smart device receives a call or a request for playing music, the primary BT controller switches the active link to switch the first link to the at least one inactive link and to switch the second link to the active link.

12. The control method according to claim 10, wherein when the primary BT controller switches the active link, the primary BT controller synchronizes with the secondary BT controller.

13. The control method according to claim 8, wherein the primary BT controller and the secondary BT controller both are disposed in the same BT earbud.

14. The control method according to claim 8, wherein the primary BT controller is disposed in a BT earbud, and the secondary BT controller is disposed in a charging case.

15. An earbud linked to only one first BT smart device via only one first link and only one second BT smart device via only one second link, the earbud comprising:
    a speaker; and
    a first BT controller configured to serve an active link at any period of time, wherein the active link is a medium for carrying data to be played by the speaker, wherein the active link is the first link.

16. The earbud according to claim 15, wherein the first BT controller is configured to be free of serving the second link at any period of time.

17. The earbud according to claim 16, wherein when the second BT smart device communicates with the earbud via the second link, the first BT controller is configured to serve the first link.

18. The earbud according to claim 17, further comprising:
    a second BT controller, independent of the first BT controller, is configured to serve an inactive link, wherein the inactive link is a medium for carrying data free of being played by the speaker, wherein the inactive link is the second link.

* * * * *